(12) United States Patent
Walston

(10) Patent No.: US 8,838,186 B2
(45) Date of Patent: Sep. 16, 2014

(54) METHOD AND SYSTEM FOR INCREASING POWER SAVINGS IN A DOCSIS DEVICE

(75) Inventor: Allen Walston, Atlanta, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 1469 days.

(21) Appl. No.: 11/688,227

(22) Filed: Mar. 19, 2007

(65) Prior Publication Data

US 2007/0218861 A1 Sep. 20, 2007

Related U.S. Application Data

(60) Provisional application No. 60/783,771, filed on Mar. 17, 2006.

(51) Int. Cl.
*H04W 88/02* (2009.01)
*H04W 52/02* (2009.01)

(52) U.S. Cl.
CPC .......... *H04W 52/0216* (2013.01); *Y02B 60/50* (2013.01); *H04W 52/0241* (2013.01)
USPC ....................................................... 455/572

(58) Field of Classification Search
USPC .......... 455/13.4, 522, 571–574, 127.1, 127.5, 455/343.1–343.6, 41.1–41.2; 370/503–520, 370/389, 479, 412; 375/354, 362–363
See application file for complete search history.

(56) References Cited

U.S. PATENT DOCUMENTS

| 7,408,887 B2* | 8/2008 | Sengupta et al. | 370/252 |
| 7,933,295 B2* | 4/2011 | Thi et al. | 370/493 |
| 8,457,040 B2* | 6/2013 | Kolze et al. | 370/324 |
| 2004/0259605 A1* | 12/2004 | Quigley et al. | 455/574 |
| 2005/0009578 A1* | 1/2005 | Liu | 455/574 |

* cited by examiner

*Primary Examiner* — Diane Mizrahi
(74) *Attorney, Agent, or Firm* — Troy A. Van Aacken

(57) ABSTRACT

Processing circuitry in a user device detects information concerning periodic station maintenance opportunities provided by a CMTS. The processor determines a quiet interval between the end of one station maintenance opportunity and the beginning of the subsequent opportunity. If offsite power to the user device is lost, the processor counts down a predetermined amount of time with a first timer and then periodically turns off RF circuitry of the device after the ending of a maintenance opportunity that follows the counting down of the first timer. The processor then begins a second timer to count the quiet interval. After counting down the quiet interval, the processor restores battery power to the RF circuitry for the duration of the maintenance opportunity.

If an off-hook condition occurs while the second counter counts down the quiet interval, the processor restores battery power to the RF circuitry.

16 Claims, 1 Drawing Sheet

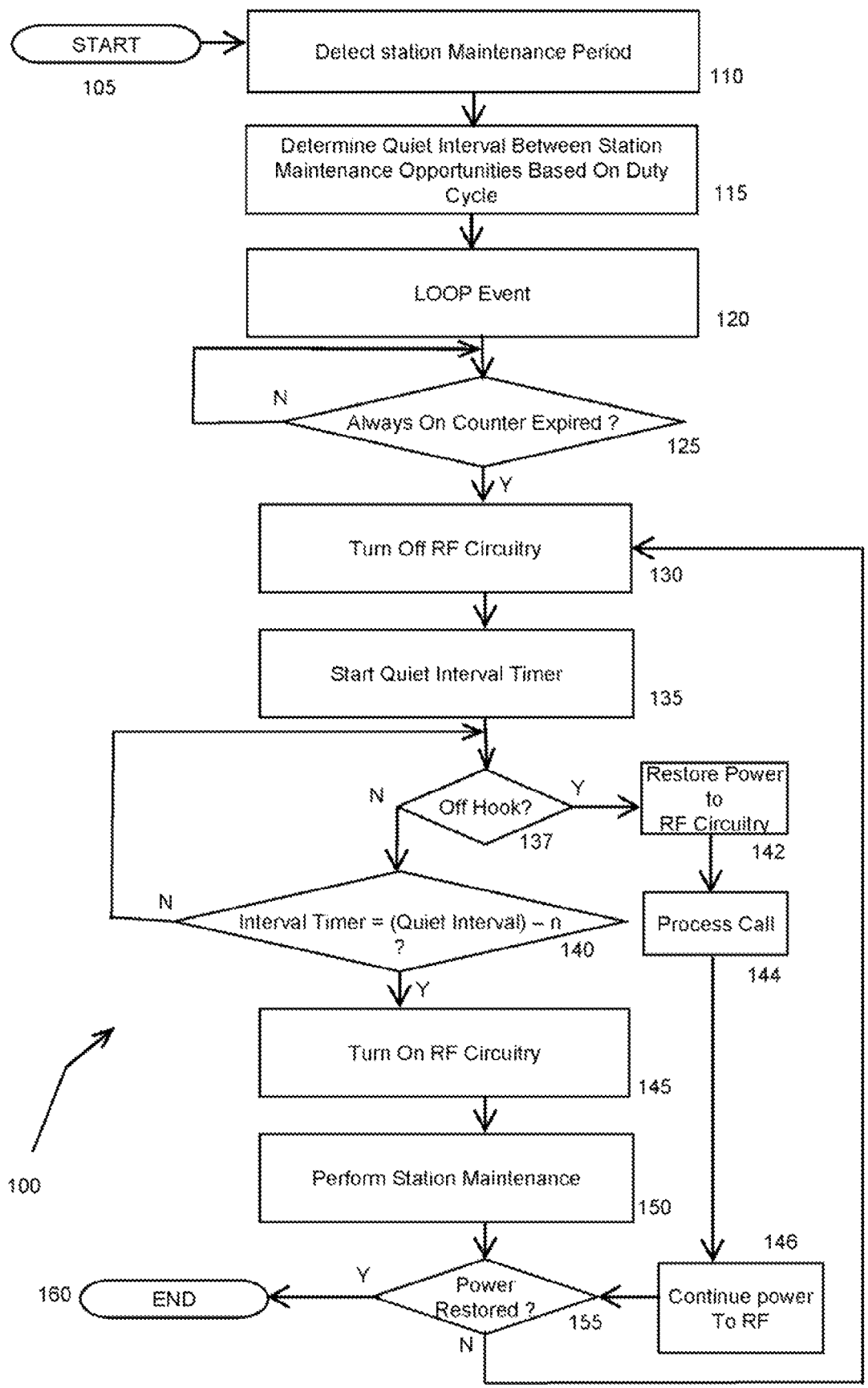

METHOD AND SYSTEM FOR INCREASING POWER SAVINGS IN A DOCSIS DEVICE

CROSS REFERENCE TO RELATED APPLICATION

This application claims the benefit of priority under 35 U.S.C. 119(e) to the filing date of Walston, et al., U.S. provisional patent application No. 60/783,771 entitled "Single ended receiver power savings on DOCSIS networks," which was filed Mar. 17, 2006, and is incorporated herein by reference in its entirety.

FIELD OF THE INVENTION

This invention relates, generally, to communication networks and, more particularly, to reducing power usage in cable modems.

BACKGROUND

Currently, broadband networks may be used to provide traditional telephony service over community antenna television ("CATV") or other communications networks using coaxial cable ("coax") or optical fiber cable. For example, ARRIS Group, Inc. offers telephone over cable products known as VOICE PORT® and TOUCHSTONE® cable modems which interface a media terminal adaptor ("MTA"), or an embedded media terminal adaptor ("EMTA"), with a data network. Unlike traditional telephone systems, which provide power to the end telephony device, the VOICE PORT® and TOUCHSTONE® products, and similar devices are typically powered from a local source, such as for example, household current. Since household current is susceptible to various outages and interruptions of service, sometimes referred to as a loss of offsite power ("LOOP"), battery backup systems are typically used to facilitate constant operation, even during a LOOP, thus ensuring accessibility during an emergency, or for other important reasons.

Although batteries typically provide an acceptable level of backup protection, they may not be able to provide sufficient during a protracted LOOP that lasts longer than a charged battery's capability to produce power. One way to provide better battery backup capabilities is to use bigger batteries, but this is costly as batteries are typically relatively expensive as compared to many typical electrical circuit components. If a larger battery backup is not used to provide more of an energy reserve, reducing power consumption is the area that is often addressed in extending battery holdup time. As known in the art, battery holdup time refers to how long (hours/minutes) a battery can maintain power during a power outage For example, desktop computers often use power saving methods that shut down various components after a predetermined amount of time has passed. While this works for computers that do not have to be capable of returning from 'sleep mode' within a few milliseconds, an MTA or EMTA/cable modem device typically need continuous communication with a centrally located remote device, typically a cable modem termination system ("CMTS").

The CMTS periodically provides ranging opportunities for the cable modem ("CM") to conduct station maintenance activity. As known in the art, station maintenance is a periodic communication between the cable modem and the CMTS to ensure that the CM is active and to provide ranging information. To respond to periodic station maintenance opportunities, circuitry in the CM requires power. The upper limit of the period between station maintenance opportunities is usually 30 seconds, with a typical period being about 15 seconds. However, the period between station maintenance opportunities may be on the order of one second.

Between station maintenance opportunities, power is consumed by the CM's RF circuitry even though the CM device may not be transmitting or receiving data. When household current is available, this is not a concern because the available power source is essentially infinite. However, during a LOOP event, when a CM device is powered by a battery, constant unproductive power consumption that results in no data being communicated wastes the important battery charge, especially when the LOOP lasts long enough to drain the battery of charge to a point where it can no longer supply sufficient power to the CM device.

Therefore, there is a need in the art for a method and system for reducing the amount of backup power consumed by a CM/EMTA device during a LOOP, while still facilitating periodic station maintenance communication between the CM and the CMTS

SUMMARY

It is an object to provide a method and system for extending the period over which a battery can provide power to a cable modem ("CM") that is coupled to a cable modem termination system ("CMTS") network. When a CM is idle, i.e., not in an active session transmitting or receiving data, its main circuitry may be periodically turned off to conserve power that would otherwise be dissipated as heat.

Rather than receive a signal from the CMTS when to turn off, the CM/MTA/EMTA device detects and determines the station maintenance interval. Then, a predetermined amount of time after a LOOP event occurs, the CM/MTA/EMTA device will turn off its RF circuitry during the interval between station maintenance opportunities. The RF circuitry is turned back on before each successive station maintenance opportunity begins. Thus, the CM/MTA/EMTA device remains registered with the CMTS, even though the RF circuitry is turned off most of the time, depending on the station maintenance duty cycle. This is desirable so that if a subscriber needs to make a phone call using a CM/MTA/EMTA device, such as a call to emergency services, the device maintains an active session with the CMTS and other network equipment which facilitate the session. By powering up the RF circuitry of a CM/MTA/EMTA device in time to perform station maintenance at regular intervals an active session between the CM/MTA/EMTA device, the CMTS and associated network equipment is maintained. Thus, the MTA is "In Service" and operating normally.

Upon detecting an off-hook condition, the CM/MTA/EMTA device turns on the RF circuitry immediately, resulting in a barely perceptible delay in providing dial tone to the user. After a call ends, the RF circuitry may stay powered for a predetermined period to support 911 callback, for example.

BRIEF DESCRIPTION OF DRAWINGS

FIG. 1 illustrates a flow diagram of a method for turning off RF circuitry during a quiet interval between station maintenance opportunities.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof.

Turing now to the figures, FIG. 1 illustrates a flow diagram of a method 100 for turning off RF circuitry during a quiet interval to reduce power consumption between station maintenance opportunities. Method 100 starts at step 105 when a CM/MTA/EMTA commences operation in an HFC coupled to a CMTS. At step 110 the CM/MTA/EMTA device detects the station maintenance period that is typically controlled by the CMTS and the MSO's head end.

The station maintenance period is a predetermined amount of time that may vary from MSO to MSO, or even between different CMTSs operated by the same MSO. Although variable, a common station maintenance period falls in the range of 15-30 seconds. A station maintenance opportunity is not a singular point in time (i.e. not a single clock cycle). Rather, a station maintenance period comprises multiple network clock cycles. Thus, a station maintenance period includes the corresponding station maintenance opportunity and the quiet interval between the ending of one station maintenance opportunity and the beginning of the successive one. The percentage defined by the ratio of the station maintenance opportunity divided by the entire station maintenance period is the duty cycle of the station maintenance opportunity.

At step 115, the CM/MTA/EMTA device determines the quiet interval based on the detected station maintenance period. It will be appreciated that rather than detecting a station maintenance period, the CM/MTA/EMTA device may detect the quiet interval between the ending of one station maintenance opportunity and the beginning of the next opportunity. Thus, if the CM/MTA/EMTA measure the station maintenance period, it will typically also measure the length of a station maintenance opportunity and subtract this from the station maintenance period. The result of this subtraction operation is interchangeable with a measured value for quiet interval.

When a LOOP event occurs at step 120, method 100 advances to step 125 and an always on timer begins counting. The always-on timer refers to the condition that RF circuitry of a CM/MTA/EMTA is on while until the counter has counted the predetermined amount of time. At step 125, a determination is made whether the 'always-on' counter/timer has counted for a predetermined amount of time. If the determination at step 125 is no, then method 100 returns to step 125 and the counter continues to count, as shown in the FIGURE by the loop-back from the 'N' output of the 125 decision diamond to its input. If the determination at step 125 is that always-on counter has counted down the predetermined amount of time, method 100 advances to step 130 and the CM/MTA/EMTA device's internal processing turns off power its RF circuitry.

At step 130 the CM/MTA/EMTA device turns off power to the RF circuitry portion contained inside. The RF circuitry is preferably turned off immediately after a given station maintenance opportunity has ended.

The general makeup of a CM/MTA/EMTA device is known to those skilled in the art and does not require further description except to note that the RF portion couples to the coaxial cable or fiber link and tunes the frequency of the channel(s) (upstream and downstream are different frequencies) over which the CMTS and CM/MTA/EMTA devices communicate with each other.

A quiet interval timer starts at step 135 after the RF circuitry portion has been turned off. As discussed above, the measured quiet interval or the maintenance opportunity period minus the length of the opportunity may be used for the quiet interval value. Method 100 advances to step 137. At step 137, a determination is made whether an off hook condition exists. An off hook would exist, for example, if a user initiated a call by either lifting a phone of its 'hook', or pushing a talk button if the phone is a more modern electronic phone. If the determination at step 137 is that an off hook condition does not exist, then method 100 advances to step 140 from step 137. If the determination at step 137 is that an off hook condition exits, then method 100 advances to step 142, turns on the RF circuitry and begins processing the call at step 144. The CM/MTA/EMTA device processor(s) continue to allow power to be supplied to the RF circuitry until the call is complete at step 146. At step 146, power may be continued to the RF circuitry for a predetermined amount of time after the call that was processed at step 144 is complete. This additional period facilitates receiving and processing an incoming call that may have been placed by an outside caller following the termination of the call that was processed at step 144; for example, an emergency 911 operator calling back.

After the call is complete, a determination is made at step 155 whether off site power has been restored to the CM/MTA/EMTA device. If the determination at step 155 is that offsite power has been restored to the device, the method ends at step 160. If the determination made at step 155 is that power has not been restored to the CM/MTA/EMTA device, method 100 returns to step 130 and continues from that point as discussed above.

Returning to discussion of the operation of method 100 from step 137, if an off hook condition is not detected, operation advances to step 140. At step 140 a determination is made whether the quiet interval timer that started at step 135 has counted down. It will be appreciated that the predetermined amount of time that the quiet interval timer counts down is based on the quiet interval determined at step 115. In addition, to ensure that the RF circuitry portion is not turned off during any portion of a station maintenance opportunity, a safety factor 'n' may be used to enhance the calculation of the quiet interval timer count value. Thus, the predetermined amount of time that the quiet interval timer may count may be the quiet interval minus safety factor n. If the determination made at step 140 is that the quiet interval timer has not counted the predetermined amount as calculated by the quiet interval minus n, then method 100 advances to step 142. Use of safety factor n may be desired to ensure that any drift in duty cycle and/or station maintenance period, which both can affect the quiet interval, after the determination at step 115 does not result in the CM/MTA/EMTA processor turning on power to the RF circuitry after a station maintenance opportunity has begun. However, use of safety factor n is not required in the determination at step 140 whether the quiet interval timer has counted down.

If the determination at step 140 is that the quiet interval timer has counted down its predetermined amount, then method 100 advances to step 145. At step 145, the CM/MTA/EMTA processing circuitry turns on the RF circuitry so that the CM/MTA/EMTA can perform station maintenance with the CMTS at step 150. Thus, the CM/MTA/EMTA device appears to the CMTS to be on and operational, because at every station maintenance opportunity the CM/MTA/EMTA device communicates with the CMTS as if is RF circuitry were always on. It will be appreciated that after detecting the quiet interval as discussed above, the CM/MTA/EMTA device turns off power to the RF circuitry without further instruction from the CMTS. After performing station maintenance at step 150, a determination is made at step 155 whether offsite power has been restored. If not, method 100 returns to step 130 and turns off the RF circuitry. If the determination made at step 155 is that offsite power has been restored, then method 100 ends at step 160.

It will be appreciate that reference above to station maintenance opportunities is in reference to a cable network that connects a CMTS at an MSO's head end and cable modem/MTA devices at a subscriber's location. However, a station maintenance opportunity is specific embodiment of any periodic two-way communication between a central network device and a plurality of remote communication devices coupled thereto. These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A method for reducing power consumption in a remote network device, the remote network device comprising a cable modem device, a media terminal adaptor, or an embedded media terminal adapter, and the remote network device being connected to a central network device, the method comprising:
   detecting a station maintenance period, wherein the station maintenance period comprises a station maintenance opportunity and a quiet interval, the station maintenance opportunity providing an opportunity for the remote network device to maintain a synchronization with the central network device;
   determining at the remote network device, a period associated with a quiet interval, wherein the period associated with a quiet interval is between station maintenance opportunities; and
   unilaterally turning off radio frequency circuitry, without input from the central network device, in the remote network device during the period associated with the quiet interval.

2. The method of claim 1 wherein the quiet interval is determined based on a duty cycle of the station maintenance opportunity and on the station maintenance period.

3. The method of claim 1 where the station maintenance period and duty cycle are detected by the remote network device's internal processing circuitry.

4. The method of claim 1 wherein the remote network device is a cable modem device.

5. The method of claim 1 wherein the remote network device includes a media terminal adaptor.

6. The method of claim 1 wherein the remote network device includes an embedded media terminal adaptor.

7. The method of claim 1 wherein the central network device is a cable modem termination system.

8. The method of claim 1 wherein the radio frequency circuitry includes quadrature amplitude modulation tuner circuits.

9. The method of claim 1 wherein power is continued to the radio frequency circuitry for a predetermined amount of time after a call has been processed following a complete call regardless of the quiet interval.

10. The method of claim 1 wherein the remote network device turns on its radio frequency circuitry between station maintenance opportunities when an asynchronous event condition occurs.

11. The method of claim 10 wherein the asynchronous event is an off-hook condition.

12. A method for reducing power consumption in a remote network device, the remote network device comprising a cable modem device, a media terminal adaptor, or an embedded media terminal adapter, and the remote network device being connected to a central network device comprising:
   receiving a station maintenance message from a central network device, the station maintenance message being received during a predefined periodic station maintenance opportunity;
   transmitting a response to the station maintenance message during the station maintenance opportunity;
   determining at the remote network device, a predefined quiet interval between station maintenance opportunities, the determination of the predefined quiet interval being based upon the received station maintenance message;
   unilaterally turning off radio frequency circuitry in the remote network device, without input from the central network device, during the predefined quiet interval between station maintenance opportunities; and
   unilaterally turning on radio frequency circuitry in the remote network device, without input from the central network device, during the predefined periodic station maintenance opportunity.

13. The method of claim 12, further comprising:
   receiving a request to transmit a message from the remote network device;
   determining whether the radio frequency circuitry is turned on responsive to receiving the request; and
   when the radio frequency circuitry is not turned on, turning on the radio frequency circuitry to transmit the message.

14. A computer implemented method, comprising:
   communicating with a central network device from a remote device during a station maintenance opportunity, the station maintenance opportunity comprising a periodic opportunity for the remote device to resynchronize with the central network device;
   identifying a quiet time between station maintenance opportunities;
   removing power from one or more of a transmitter or a receiver associated with the remote device during the quiet time;
   detecting a request for service during the quiet time;
   supplying power to the transmitter and receiver associated with the remote device responsive to the request for service;
   detecting a discontinuation of service during the quiet time;
   removing power to one or more of the transmitter or the receiver responsive to detecting the discontinuation of service during the quiet time; and
   supplying power to the transmitter and receiver associated with the remote device during the station maintenance opportunity.

15. The computer implemented method of claim 14, wherein communication with the central network device during the maintenance opportunity prevents the central network device from deregistering the remote device.

16. The computer implemented method of claim 14, wherein the quiet time is not identified responsive to user activity.

* * * * *